(12) United States Patent
Kogure

(10) Patent No.: US 9,013,730 B2
(45) Date of Patent: Apr. 21, 2015

(54) PRINTING APPARATUS EQUIPPED WITH WIRELESS COMMUNICATION FUNCTION, METHOD OF CONTROLLING THE SAME, AND STORAGE MEDIUM

(71) Applicant: Canon Kabushiki Kaisha, Tokyo (JP)

(72) Inventor: Takeshi Kogure, Kawasaki (JP)

(73) Assignee: Canon Kabushiki Kaisha (JP)

(*) Notice: Subject to any disclaimer, the term of this patent is extended or adjusted under 35 U.S.C. 154(b) by 239 days.

(21) Appl. No.: 13/675,139

(22) Filed: Nov. 13, 2012

(65) Prior Publication Data
US 2013/0135658 A1 May 30, 2013

(30) Foreign Application Priority Data

Nov. 24, 2011 (JP) ................. 2011-256101

(51) Int. Cl.
G06K 15/00 (2006.01)
G06F 21/31 (2013.01)
G06F 21/60 (2013.01)
G06K 15/02 (2006.01)
G06F 3/12 (2006.01)

(52) U.S. Cl.
CPC ............. *G06F 21/31* (2013.01); *G06F 3/1222* (2013.01); *G06F 3/1238* (2013.01); *G06F 3/1292* (2013.01); *G06F 21/608* (2013.01); *G06F 2221/2113* (2013.01); *G06K 15/1822* (2013.01); *G06K 15/4095* (2013.01)

(58) Field of Classification Search
CPC ............. G06F 21/31; G06F 21/608; G06F 2221/2113; G06F 3/1222; G06F 3/1238; G06F 3/1292; G06K 15/1822; G06K 15/4095
USPC ................. 358/1.14, 1.15; 726/3, 4
See application file for complete search history.

(56) References Cited

U.S. PATENT DOCUMENTS

2005/0183141 A1* 8/2005 Sawada .......................... 726/16
2006/0272010 A1* 11/2006 Kim .................................. 726/3

FOREIGN PATENT DOCUMENTS

JP 2003-223307 A 8/2003

* cited by examiner

Primary Examiner — Fred Guillermety
(74) Attorney, Agent, or Firm — Rossi, Kimms & McDowell LLP

(57) ABSTRACT

A printing apparatus enabling prevention of unauthorized access from an external apparatus. The printing apparatus receives print data from an external apparatus through wireless communication, and determines whether or not the received print data has authentication information added thereto. When it is determined that the print data has authentication information added thereto, the image data is printed depending on reception of the authentication information from a user. Further, it is determined whether or not the level of security of an encryption method employed in the wireless communication is lower than a predetermined security level. When the print data does not have authentication information added thereto and when the level of security is lower than the predetermined security level, the printing apparatus restricts printing based on the received print data.

13 Claims, 9 Drawing Sheets

FIG.8

Print data from a terminal selected here will be printed immediately from next time on without being held.

| No: | NAME | : TERMINAL |
|---|---|---|
| 1: | Document 1.doc | : PC1 |
| 2: | test.txt | : PC2 |
| 3: | Picture.jpg | : PC3 |

PRINTING APPARATUS EQUIPPED WITH WIRELESS COMMUNICATION FUNCTION, METHOD OF CONTROLLING THE SAME, AND STORAGE MEDIUM

BACKGROUND OF THE INVENTION

1. Field of the Invention

The present invention relates to a printing apparatus, a method of controlling the same, and a storage medium, and more particularly to a printing apparatus equipped with a wireless communication function.

2. Description of the Related Art

Conventionally, there have been used printing apparatuses, such as copying machines, printers, and facsimile machines. In recent years, there has appeared a printing apparatus equipped with a wireless communication function, such as a wireless LAN function. The use of a wireless LAN eliminates the need of wiring of cables or the like, which makes it possible to use a printing apparatus e.g. from an external apparatus existing outside a building where the printing apparatus is installed.

Since the use of wireless LAN enables a printing apparatus to be accessed from an external apparatus without providing wiring, the printing apparatus can be accessed by a user who is not expected by an administrator. In order to prevent such unexpected access, user authentication using a WEP (wired equivalent privacy) key is performed when connecting to a printing apparatus by a wireless LAN, for example.

On the other hand, there also exists a wireless LAN access point (hereinafter simply referred to as "the wireless access point") of a type configured to omit user authentication. When a wireless access point of this type is used, a wireless connection can be established in a so-called authentication-free fashion. This type of wireless access point will be referred to as the authentication-free wireless access point.

When a printing apparatus is wirelessly connected to an external apparatus, such as a personal computer (PC), by the authentication-free wireless access point, it is possible to access the printing apparatus from the PC to cause the printing apparatus to execute a print job or the like job. This means that the use of the authentication-free wireless access point can allow unauthorized use of the printing apparatus by an unspecified number of external apparatuses.

By the way, there has been proposed a method of restricting remote access to a printing apparatus, in which when an access request is received from an external apparatus, the printing apparatus extracts an IP address and a MAC address for identifying the external apparatus, and authorizes access from the external apparatus only when the IP address and the MAC address match an IP address and a MAC address registered in advance (see e.g. Japanese Paten Laid-Open Publication No. 2003-223307). Thus, in the method disclosed in Japanese Paten Laid-Open Publication No. 2003-223307, only external apparatuses approved by the administrator of the printing apparatus in advance are authorized to access the printing apparatus.

By the way, it is a common practice to prevent leakage of information on a result (e.g. a print product) obtained by the printing apparatus to a third party. To this end, when a print job request is received from an external apparatus, image data associated with a print job is temporarily stored in the printing apparatus. Then, a user performs an authentication operation by the printing apparatus, and when the user is authenticated, the print job is executed. This method is called secure printing.

As described hereinbefore, according to Japanese Paten Laid-Open Publication No. 2003-223307, only if identification information on an external apparatus is registered in advance in a printing apparatus, the external apparatus is authorized to access the printing apparatus. In the case of performing the advance registration, the registration is required to be approved by the administrator of the printing apparatus. Further, it is required to accurately register the identification information on the external apparatus in the printing apparatus so as to be authorized to access the printing apparatus.

Under the above-described circumstances, when an external apparatus, such as a PC, is installed anew in a business or an office, it is required to send identification information on the external apparatus to the administrator of the printing apparatus and request the administrator to register the same, and hence there is a problem in user friendliness. In addition, if registration processing cannot be performed e.g. due to absence of the administrator, the external apparatus is not authorized to access the printing apparatus until the registration is executed, which also causes a problem in user friendliness.

SUMMARY OF THE INVENTION

The present invention provides a printing apparatus which makes it possible not only to prevent unauthorized access from an external apparatus, such as a PC, but also to improve user friendliness, a method of controlling the printing apparatus, and a storage medium storing a control program for implementing the method.

In a first aspect of the present invention, there is provided a printing apparatus capable of communicating with external apparatuses, comprising a reception unit configured to receive print data from an external apparatus through wireless communication, a first determination unit configured to determine whether or not the received print data has authentication information added thereto, a printing unit configured to print, when the first determination unit has determined that the print data has authentication information added thereto, the image data, depending on reception of the authentication information from a user, at the printing apparatus, a second determination unit configured to determine whether or not a level of security of an encryption method employed in the wireless communication is lower than a predetermined security level, and a control unit configured to restrict, when the first determination unit determines that the print data does not have authentication information added thereto and when the second determination unit determines that the level of security is lower than the predetermined security level, printing based on the received print data.

In a second aspect of the present invention, there is provided a method of controlling a printing apparatus, comprising receiving print data from an external apparatus through wireless communication, determining whether or not the received print data has authentication information added thereto, printing, when it is determined that the print data has authentication information added thereto, the image data, depending on reception of the authentication information from a user, determining whether or not a level of security of an encryption method employed in the wireless communication is lower than a predetermined security level, and restricting, when it is determined that the print data does not have authentication information added thereto and when it is determined that the level of security is lower than the predetermined security level, printing based on the received print data.

In a third aspect of the present invention, there is provided a non-transitory computer-readable storage medium storing a computer-executable control program for causing a computer to execute a method of controlling a printing apparatus, wherein the method comprises receiving print data from an external apparatus through wireless communication, determining whether or not the received print data has authentication information added thereto, printing, when it is determined that the print data has authentication information added thereto, the image data, depending on reception of the authentication information from a user, determining whether or not a level of security of an encryption method employed in the wireless communication is lower than a predetermined security level, and restricting, when it is determined that the print data does not have authentication information added thereto and when it is determined that the level of security is lower than the predetermined security level, printing based on the received print data.

According to the present invention, it is possible not only to prevent unauthorized access from an external apparatus, but also to improve user friendliness.

Further features of the present invention will become apparent from the following description of exemplary embodiments with reference to the attached drawings.

BRIEF DESCRIPTION OF THE DRAWINGS

FIGS. 5A and 5B are views of examples of dialogs displayed on the remote terminal appearing in FIG. 1, in which FIG. 5A shows a normal printing dialog, and FIG. 5B shows a secure printing dialog.

FIG. 8 is a view of an example of a display screen displayed on a console panel during execution of a job holding process by the image forming apparatus of the second embodiment.

DESCRIPTION OF THE EMBODIMENTS

The present invention will now be described in detail below with reference to the accompanying drawings showing embodiments thereof.

Figure 1:
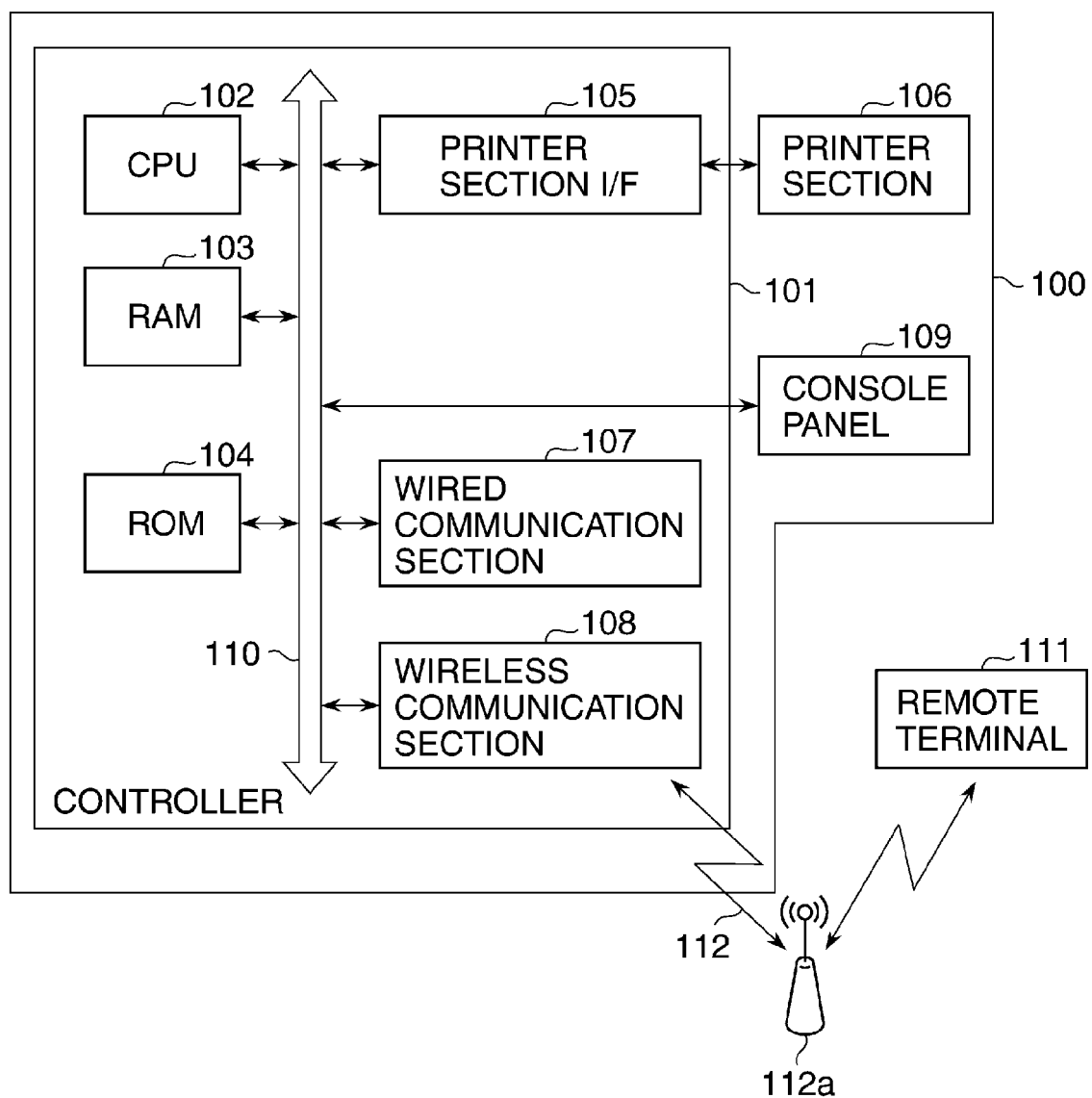
FIG. 1 is a block diagram showing the hardware configuration of an image forming apparatus as an example of a printing apparatus according to a first embodiment of the present embodiment.

FIG. 1 is a block diagram showing the hardware configuration of an image forming apparatus (printing apparatus) according to a first embodiment of the present embodiment.

The image forming apparatus 100 in FIG. 1 comprises a controller 101, a printer section 106, and a console panel (console section) 109, and the printer section 106 and the console panel 109 are controlled by the controller 101.

The controller 101 comprises a CPU 102, a RAM 103, a ROM 104, a printer section interface (I/F) 105, a wired communication section 107, and a wireless communication section 108 (reception unit). The CPU 102, the RAM 103, the ROM (e.g. electrically erasable programmable ROM) 104, the printer section interface 105, the wired communication section 107, and the wireless communication section 108 are interconnected by a system bus 110. The CPU 102 performs control according to various control programs stored in the program area of the ROM 104. When executing a control program, the control program is loaded into the RAM 103 from the ROM 104, for example. The control programs may be stored in a hard disk drive (HDD, not shown).

The wired communication section 107 communicates with a remote terminal 111 via a wired LAN (not shown). The wireless communication section 108 communicates with the remote terminal 111 via a wireless LAN 112. Although in FIG. 1, only the remote terminal 111 is shown as an external apparatus, a plurality of remote terminals may exist.

In a case where the wireless communication section 108 communicates with the remote terminal 111 via the wireless LAN 112, the wireless communication is relayed by a wireless LAN access point (wireless access point) 112a. In the case of accessing the image forming apparatus 100, the remote terminal 111 uses the wireless access point 112a located close thereto.

In this access operation, the remote terminal 111 outputs an access request signal to which are added at least apparatus identification information for identifying an image forming apparatus to be accessed and terminal identification information for identifying the remote terminal 111. This access request signal is given to the CPU 102 of the image forming apparatus 100 via the wireless communication section 108 of the same. When the received apparatus identification information matches the image forming apparatus's own apparatus identification information and at the same time the terminal identification information matches registered terminal information which has been registered in the ROM 104 in advance, the CPU 102 performs predetermined authentication on the wireless access point 112a, as described hereinafter, and then sends an access authorization signal to the remote terminal 111 via the wireless communication section 108 according to the result of the authentication. Thus, the remote terminal 111 is authorized to perform a print job using the image forming apparatus 100.

Note that when the CPU 102 refuses access authorization, terminal identification information associated with the refused access authorization is stored in the ROM 104, as refused terminal information.

The printer section interface 105 provides interface for outputting image data from the CPU 102 to the printer section (printer engine) 106. The CPU 102 displays characters or symbols on the display section of the console panel 109, using font information stored in a font area, not shown, of the ROM 104. Further, the CPU 102 executes processing according to instruction information received via the console panel 109.

Note that a data area, not shown, of the ROM 104 stores setting information including e.g. apparatus information associated with the image forming apparatus 100, user telephone book information, and department management information. The CPU 102 reads out and updates the setting information, as required.

Figure 2:
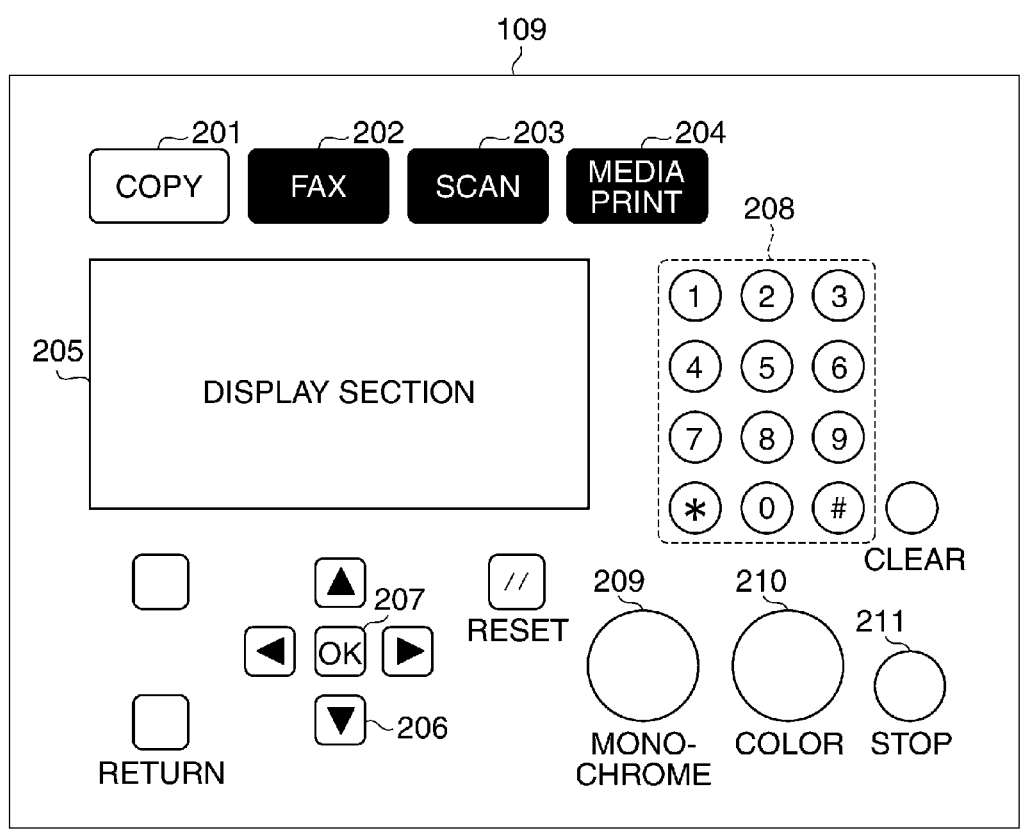
FIG. 2 is a view of an example of a console panel appearing in FIG. 1.

FIG. 2 is a view of an example of the console panel 109 appearing in FIG. 1.

Referring to FIG. 2, the console panel 109 includes a display section 205, and the display section 205 displays e.g. a configuration status and an apparatus status of the image forming apparatus 100. An arrow key pad 206 is used to shift a cursor or the like displayed on the display section 205. The arrow key pad 206 has four direction buttons, i.e. up, down, left, and right buttons, and an OK key 207 is disposed in the center thereof. When the OK key 207 is pressed, a setting or a response to a query is determined.

In the case of performing secure printing (secure job), when a user selects a print job to be subjected to printing from a print job list displayed on the display section 205 and inputs a password (authentication information) set for secure printing, the CPU 102 starts printing associated with the selected print job.

Note that the console panel 109 is provided with not only a copy key 201, a FAX key 202, a scan key 203, and a media print key 204, but also a ten-key pad 208, a monochrome key 209, a color key 210, a stop key 211, and so forth. The functions of these keys are not directly related to the present embodiment, and therefore description thereof is omitted.

Figure 3:
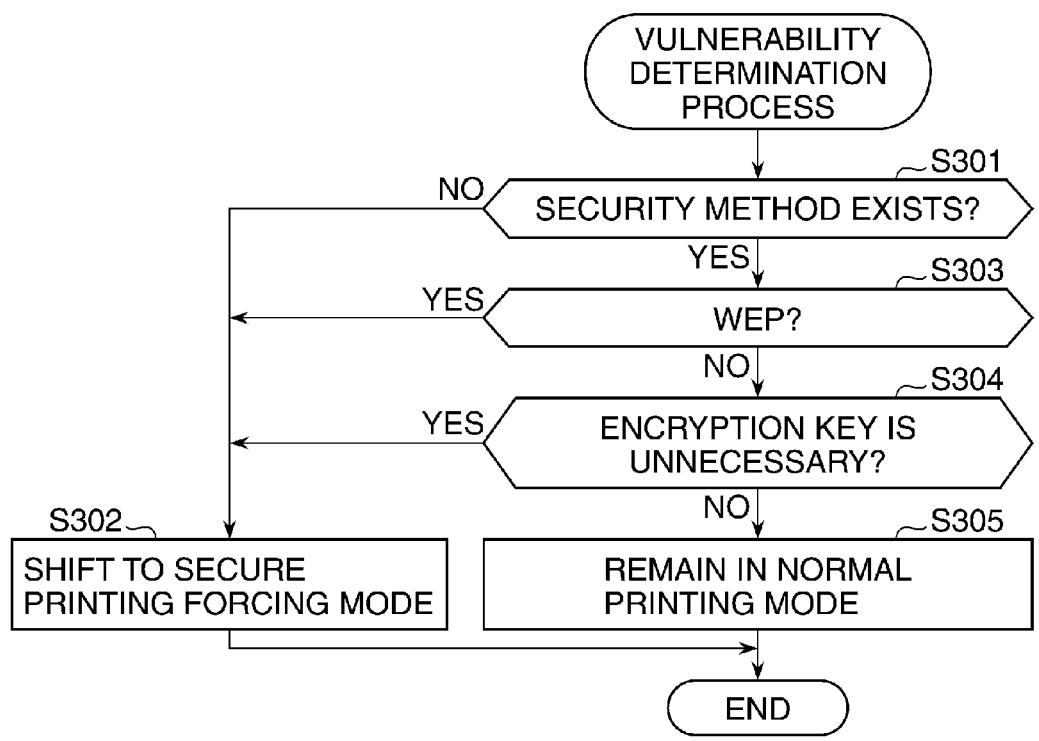
FIG. 3 is a flowchart of a vulnerability determination process executed by the image forming apparatus shown in FIG. 1, so as to determine the vulnerability of a wireless access point.

FIG. 3 is a flowchart of a vulnerability determination process executed by the image forming apparatus shown in FIG. 1, so as to determine the vulnerability of a wireless access point.

As described hereinbefore, in a case where the remote terminal 111 executes a print job using the image forming apparatus 100 via the wireless LAN 112, first, the remote terminal 111 sends an access request signal to the image forming apparatus 100 via the wireless access point 112a.

Upon receipt of the access request signal from the wireless access point 112a, the CPU 102 checks a security method (encryption method: e.g. WEP) of the wireless access point 112a. In the present embodiment, the CPU 102 checks whether or not the wireless access point 112a has a security method (step S301). Note that the CPU 102 can perform communication via the wireless communication section 108, using an encryption method of a wireless access point with which the image forming apparatus 100 can communicate.

If the wireless access point 112a has no security method (NO to the step S301), the CPU 102 judges that the wireless access point 112a is vulnerable (more specifically, the image forming apparatus 100 has a possibility of unauthorized use), and causes the image forming apparatus 100 to shift to a secure printing forcing mode (secure job forcing mode) (step S302). Then, the CPU 102 notifies the remote terminal 111 that only secure printing can be executed, followed by terminating the vulnerability determination process.

Note that secure printing is executed in consideration of unauthorized use, as described hereinbefore. In secure printing, when a print job request (print request) is received from the remote terminal 111, the CPU 102 temporarily stores image data associated with the print job in the image forming apparatus 100 (e.g. in the RAM 103 in the present example). Then, the user inputs his/her password (authentication information) via the console panel 109 of the image forming apparatus 100. The CPU 102 executes authentication processing to determine whether or not the entered password (authentication information) matches a password (authentication information) registered in advance. If the two passwords match, the CPU 102 executes the print job according to the stored image data.

On the other hand, if the wireless access point 112a has a security method (YES to the step S301), the CPU 102 determines whether or not the security method is a predetermined one (WEP in the present example) (step S303). If the security method is WEP (YES to the step S303), the CPU 102 judges that the wireless access point 112a is vulnerable, and the CPU 102 proceeds to the step S302.

If the security method is not WEP (NO to the step S303), the CPU 102 determines whether or not an encryption key is unnecessary for the security method (step S304). If an encryption key is necessary (NO to the step S304), the CPU 102 judges that the wireless access point 112a is secure, and continues to remain in a normal printing mode (step S305). Then, the CPU 102 notifies the remote terminal 111 that the image forming apparatus 100 is in the normal printing mode, followed by terminating the vulnerability determination process. Thus, the CPU 102 executes printing according to the print job sent from the remote terminal 111.

If an encryption key is unnecessary for the security method (YES to the step S304), the CPU 102 judges that the wireless access point 112a is vulnerable, and the CPU 102 proceeds to the step S302.

Figure 4:
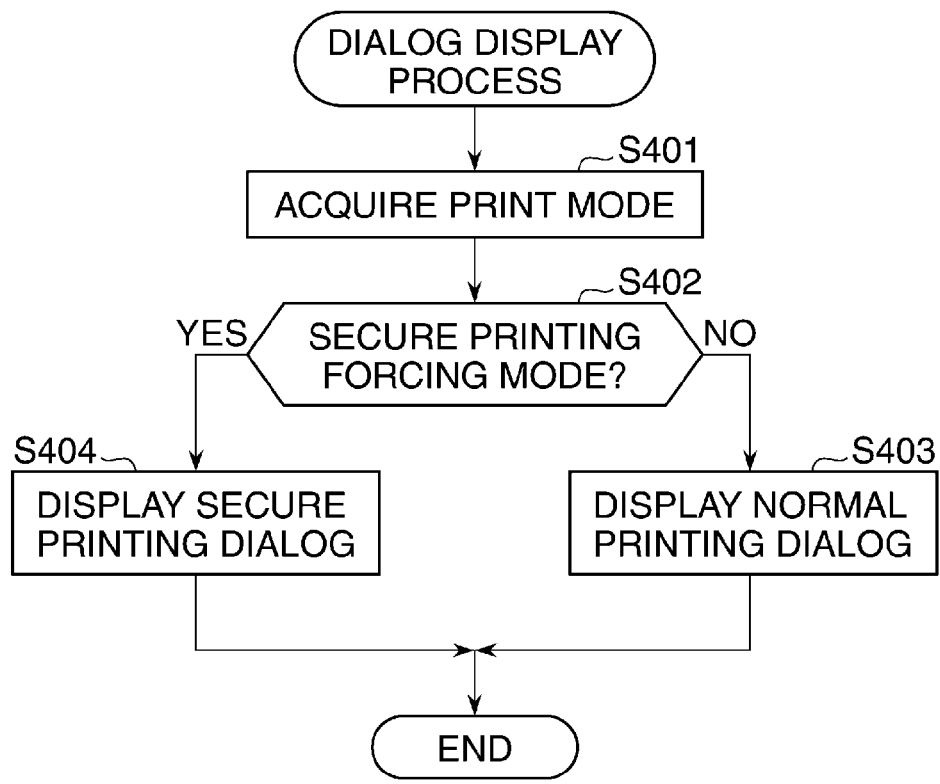
FIG. 4 is a flowchart of a dialog display process for displaying a dialog on a remote terminal, appearing in FIG. 1, during execution of a print job sent from the remote terminal.

FIG. 4 is a flowchart of a dialog display process for displaying a dialog on the remote terminal 111 appearing in FIG. 1.

The remote terminal 111 in FIG. 1 has a printer driver installed therein. Based on the dialog displayed on the remote terminal 111, the user designates whether to perform secure printing (secure job) or normal printing (normal job), as described hereinafter. Normal printing includes all types of printing except secure printing.

As described hereinbefore, the image forming apparatus 100 shifts to the secure printing forcing mode or to the normal printing mode according to the security method. Then, the CPU 102 notifies the remote terminal 111 of the fact. More specifically, the remote terminal 111 acquires the printing mode (i.e. the job mode) from the image forming apparatus 100 (step S401: acquisition unit).

In response to the notification from the CPU 102, the remote terminal 111 checks whether or not the image forming apparatus 100 is in the secure printing forcing mode (step S402: mode determination unit). If the image forming apparatus 100 is not in the secure printing forcing mode (NO to the step S402), the remote terminal 111 displays a normal printing dialog on its display section (step S403: display control unit), followed by terminating the dialog display process.

On the other hand, if the image forming apparatus 100 is in the secure printing forcing mode (YES to the step S402), the remote terminal 111 displays a secure printing dialog on its display section (step S404: display control unit), followed by terminating the dialog display process.

Figure 5A:
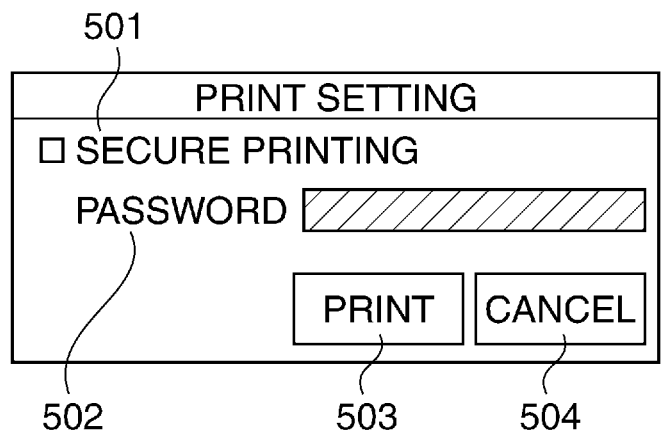
Figure 5B:
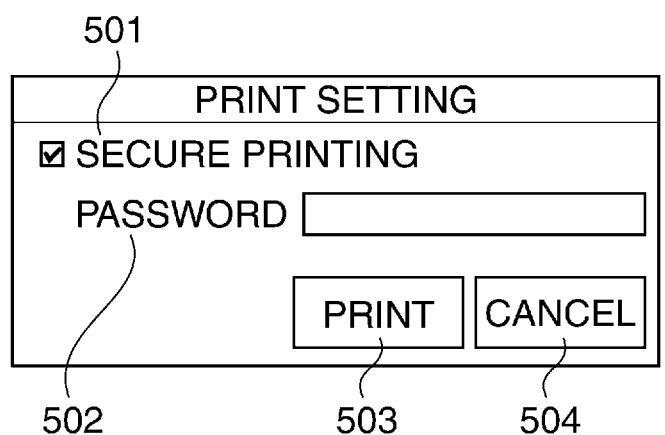

FIGS. 5A and 5B are views of examples of the dialogs displayed on the remote terminal 111 appearing in FIG. 1. FIG. 5A shows the normal printing dialog, and FIG. 5B shows the secure printing dialog.

Referring to FIG. 5A, in the normal printing dialog (print setting screen) is displayed a secure printing checkbox 501 used for entering a check mark to indicate whether or not to execute secure printing. Further, a password field 502, a print button 503, and a cancel button 504 are displayed.

When the user presses the print button 503, an instruction for normal printing is issued as a print request from the remote terminal 111 to the CPU 102 of the image forming apparatus 100 via the wireless access point 112a together with a print job. In response to this, the CPU 102 causes the printer section 106 to execute printing according to the print job (normal printing). On the other hand, when the user presses the cancel button 504, an instruction for cancellation of printing is issued from the remote terminal 111 to the CPU 102 via the wireless access point 112a. In response to this, the CPU 102 cancels printing (job cancellation).

From the normal printing dialog shown in FIG. 5A, the user can designate secure printing. In this case, the user enters a check mark in the secure printing checkbox 501. As a consequence, the remote terminal 111 changes the password field 502 into a state enabled for entry of a password (designation unit). The user enters a password assigned to him/her in advance in the password field 502 and presses the print button 503.

When the user presses the print button 503, the remote terminal 111 sends a print job and an instruction for secure printing as a print request to the CPU 102 via the wireless access point 112a together with the password. When a printing instruction has a password added thereto, the CPU 102 temporarily stores image data associated with the print job e.g. in the RAM 103, and waits for the password to be entered again via the console panel 109. Then, when the user enters the password again via the console panel 109, the CPU 102 checks the entered password against the received password. When the two passwords match, the CPU 102 causes the printer section 106 to execute printing according to the image data stored in the RAM 103 (secure printing).

Referring to FIG. 5B, in the secure printing dialog (print setting screen) are displayed the secure printing checkbox 501, the password field 502, the print button 503, and the cancel button 504, similarly to the normal printing dialog. In the default state, the secure printing dialog is displayed with the secure printing designated. More specifically, the secure printing checkbox 501 has a check mark entered therein. Further, the password field 502 is displayed in a state enabled for entry of a password.

In the case of performing the secure printing, the user issues an instruction for secure printing in the same way as described with reference to the normal printing dialog.

Figure 6:
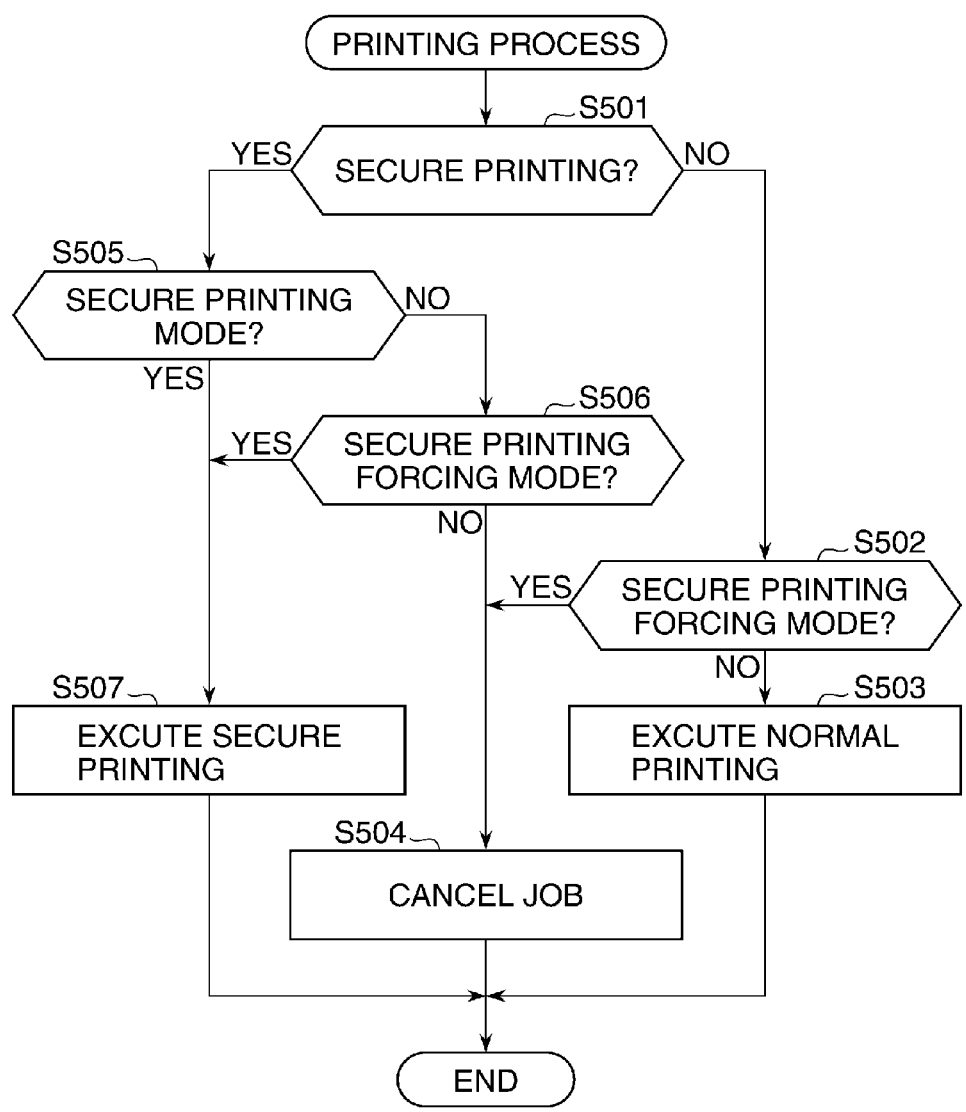
FIG. 6 is a flowchart of a printing process executed by the image forming apparatus shown in FIG. 1.

FIG. 6 is a flowchart of a printing process executed in the image forming apparatus shown in FIG. 1.

Upon receipt of the print request, the CPU 102 determines whether or not the print request is for secure printing, i.e. determines a print type (step S501). If the print type is not secure printing (NO to the step S501), i.e. if the print type is normal printing, the CPU 102 checks whether or not the image forming apparatus 100 has been set to the secure printing forcing mode (step S502). If the secure printing forcing mode has not been set (NO to the step S502), the CPU 102 executes normal printing (normal job process) (step S503), followed by terminating the printing process.

On the other hand, if the image forming apparatus 100 has been set to the secure printing forcing mode (YES to the step S502), the CPU 102 judges that it is impossible to execute normal printing, and cancels the job (step S504), followed by terminating the printing process.

If the print type is secure printing (YES to the step S501), the CPU 102 determines whether or not the image forming apparatus 100 is in the secure printing mode (step S505). The secure printing mode indicates a state where the image forming apparatus 100 is set to a state capable of performing only secure printing. The setting of the secure printing mode is manually performed by the user.

More specifically, in the image forming apparatus 100, the user can operate the console panel (designation unit) 109 to thereby set printing to be executed by the image forming apparatus 100 to either a secure printing setting (secure job setting: a setting of a job for causing the job to be executed in the secure printing mode of the image forming apparatus) or a normal print setting (normal job setting: a setting of a job for causing the job to be executed in the normal printing mode of the image forming apparatus). When the wireless access point 112a is vulnerable, the image forming apparatus 100 is forcibly shifted to the secure printing mode, i.e. brought into the secure printing forcing mode.

If the image forming apparatus 100 is not in the secure printing mode (NO to the step S505), the CPU 102 checks whether or not the image forming apparatus 100 has been set to the secure printing forcing mode (step S506). If the image forming apparatus 100 has been set to the secure printing forcing mode (YES to the step S506), the CPU 102 executes secure printing (i.e. the secure job process) (step S507), followed by terminating the printing process.

If the image forming apparatus 100 has not been set to the secure printing forcing mode (NO to the step S506), the CPU 102 proceeds to the step S504, wherein the CPU 102 cancels the job.

If the image forming apparatus 100 is in the secure printing mode (YES to the step S505), the CPU 102 proceeds to the step S507, wherein the CPU 102 executes secure printing.

With the current state of the art, an encryption method (e.g. WPA) which is higher in security strength than WEP is widely used. WEP is lower in security strength than WPA (Wi-Fi Protected Access). Therefore, in the present embodiment, it is judged that the wireless access point 112a supporting WEP is vulnerable. Note that, however, the wireless access point 112a supporting WEP may be treated as a non-vulnerable secure access point.

If an encryption method higher in security strength than WPA comes into widespread use, a wireless access point 112a supporting WAP may be judged as a vulnerable access point.

As can be easily understood from the above description, the CPU 102 determines whether or not the level of security in an encryption method used for wireless communication is lower than a predetermined security level, and when the level of security in the encryption method is lower, the CPU 102 causes the image forming apparatus 100 to shift to the secure printing forcing mode and suspends a job process associated with a print job received from the remote terminal 111. Then, when the user inputs his/her password via the console panel 109 (console section) and is authenticated (i.e. if a predetermined input operation is performed), processing of the suspended job is resumed.

As described above, according to the first embodiment, when it is determined that the wireless access point 112a is vulnerable in terms of security, the image forming apparatus 100 is brought into the secure printing forcing mode, so that it is possible not only to prevent unauthorized access from a remote terminal, but also to improve user friendliness. That is, according to the present invention, when the wireless access point 112a is vulnerable in terms of security, only users who can physically access the image forming apparatus 100 are authorized to use the image forming apparatus 100 for printing, and therefore it is possible to prevent unauthorized access. Further, since it is possible to enable the users to execute printing without advance registration, user friendliness can be improved.

Next, a description will be given of an image forming apparatus according to a second embodiment of the present invention. The configuration of hardware of the image forming apparatus according to the second embodiment is the same as that of the image forming apparatus in FIG. 1, and therefore description thereof is omitted.

In the first embodiment, in order to prevent unauthorized use of the image forming apparatus by a remote terminal, it is determined whether or not the wireless access point 112a used by the remote terminal 111 for access to the image forming apparatus 100 is vulnerable, and when the wireless access point 112a is vulnerable, the image forming apparatus 100 is shifted to the secure printing forcing mode. In the second embodiment, even if the wireless access point 112a is vulnerable, the image forming apparatus 100 is not shifted to the secure printing forcing mode, but printing is restricted by converting the print job to a hold print job.

Figure 7:
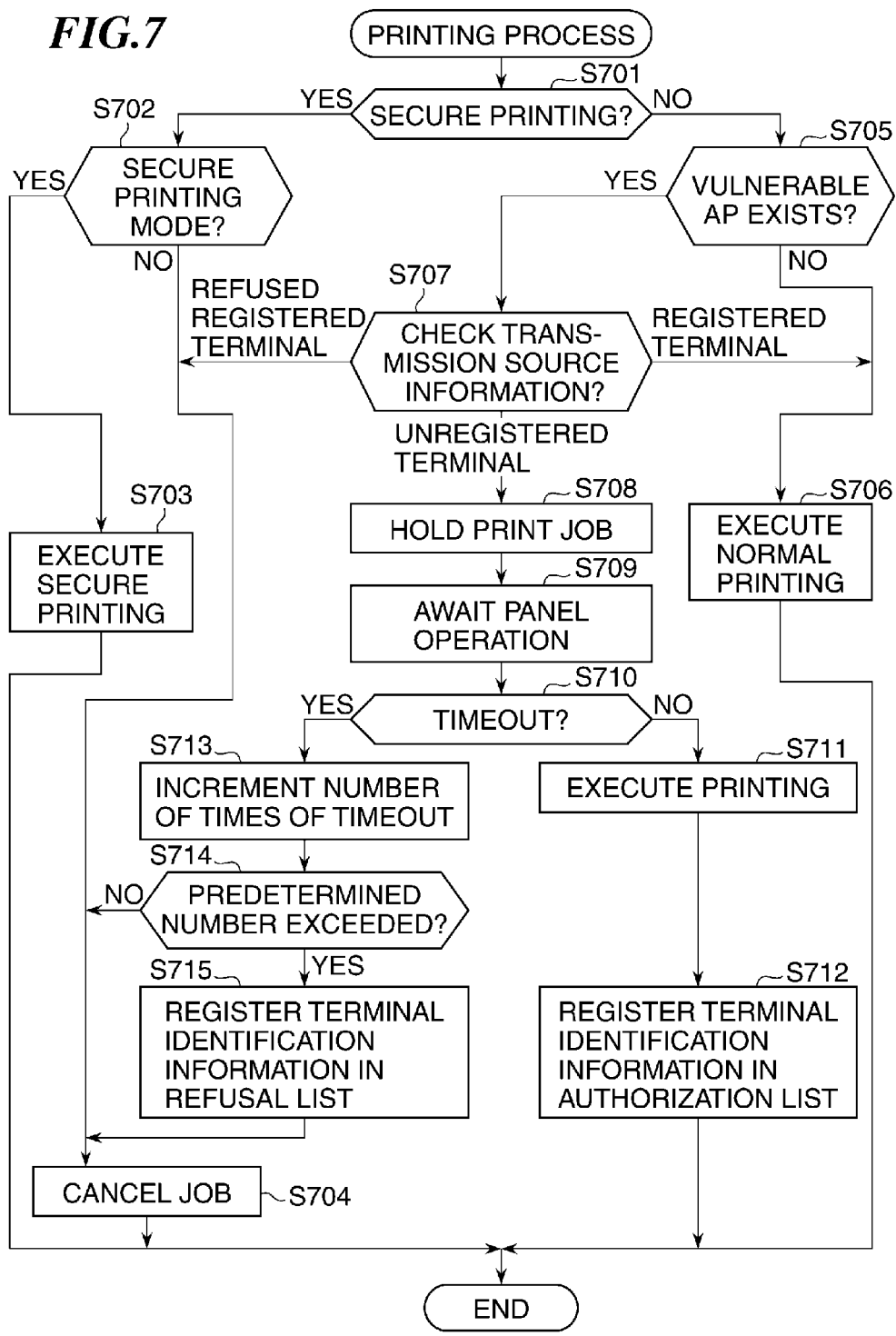
FIG. 7 is a flowchart of a printing process executed by an image forming apparatus according to a second embodiment of the present invention.

FIG. 7 is a flowchart of a printing process executed by the image forming apparatus of the second embodiment of the present invention.

Upon receipt of a print request as described in the first embodiment, the CPU 102 determines whether or not the print request is for secure printing (step S701). If the print type is secure printing (YES to the step S701), the CPU 102 determines whether or not the image forming apparatus 100 is in the secure printing mode (step S702).

If the image forming apparatus 100 is in the secure printing mode (YES to the step S702), the CPU 102 executes secure printing, as described hereinbefore (step S703), followed by terminating the present printing process.

On the other hand, if the image forming apparatus 100 is not in the secure printing mode (NO to the step S702), the CPU 102 judges that it is impossible to execute secure printing, and cancels the job (step S704), followed by terminating the printing process.

If the print type is not secure printing, i.e. if the print type is normal printing (NO to the step S701), the CPU 102 checks whether or not the wireless access point 112a is vulnerable, as described with reference to FIG. 3 (step S705).

If it is determined that the wireless access point 112a is not vulnerable (NO to the step S705), the CPU 102 executes normal printing as described in the first embodiment (step S706), followed by termination the present printing process.

If it is determined that the wireless access point 112a is vulnerable (YES to the step S705), the CPU 102 checks sender information (terminal identification information) contained in the print request (step S707). If the terminal identification information has been registered in the ROM 104 ("Registered Terminal" in the step S707), the CPU 102 proceeds to the step S706, wherein the CPU 102 executes normal printing.

If the terminal identification information has been registered as refused terminal information in the ROM 104 ("Refused Registered Terminal" in the step S707), the CPU 102 judges that the image forming apparatus 100 can be subjected to unauthorized use, so that the CPU 102 proceeds to the step S704, wherein the job is canceled.

If the terminal identification information has not been registered in the ROM 104 ("Unregistered Terminal" in the step S707), the CPU 102 does not execute the printing process immediately, but executes a job holding process for holding a print job (print data) as a hold print job in the RAM 103 (step S708). More specifically, the printing process based on the received print data is suspended, and the printing process is resumed only when a predetermined input operation is performed by the user. In short, the CPU 102 is placed in a hold printing forcing mode.

FIG. 8 is a view of an example of a display screen (operation screen) displayed on the console panel 109 during execution of the job holding process by the image forming apparatus of the second embodiment.

When the job holding process is executed, the CPU 102 displays on the console panel 109 the operation screen shown in FIG. 8. The operation screen displays a message "Print data from a terminal selected here will be printed immediately from next time on without being held". Further, the operation screen also displays a list of print jobs (each indicated by No., Name, and Terminal). The user selects print data (Name) to be printed from the list on the operation screen. At this time, the CPU 102 prompts the user to enter a password, as required.

The CPU 102 waits until an input is received via the console panel (step S709). The CPU 102 starts measuring time using an internal timer from a time point when the operation screen is displayed on the console panel 109. The CPU 102 determines whether or not a predetermined time period has elapsed before the console panel 109 is operated, i.e. before selection of print data is completed (step S710). In short, the CPU 102 determines whether or not timeout has occurred.

If an input operation is performed before timeout occurs (NO to the step S710), the CPU 102 executes printing according to the print data held in the RAM 103 (step S711). Then, after completion of the printing, the CPU 102 registers terminal identification information on the remote terminal 111 (transmission source terminal) in an authorization list, as registered terminal information (step S712), followed by terminating the printing process.

On the other hand, if timeout has occurred (YES to the step S710), the CPU 102 increments the number of times of timeout concerning the remote terminal associated with the terminal identification information (step S713). Then, the CPU 102 determines whether or not the number of times of timeout has exceeded a predetermined number (step S714).

If the number of times of timeout has not exceeded the predetermined number (NO to the step S714), the CPU 102 proceeds to the step S704, wherein the CPU 102 cancels the job. If the number of times of timeout has exceeded the predetermined number (YES to the step S714), the CPU 102 registers the terminal identification information on the remote terminal 111 (transmission source terminal) as refused terminal information in a refusal list (step S715), followed by terminating the present printing process.

Figure 9:
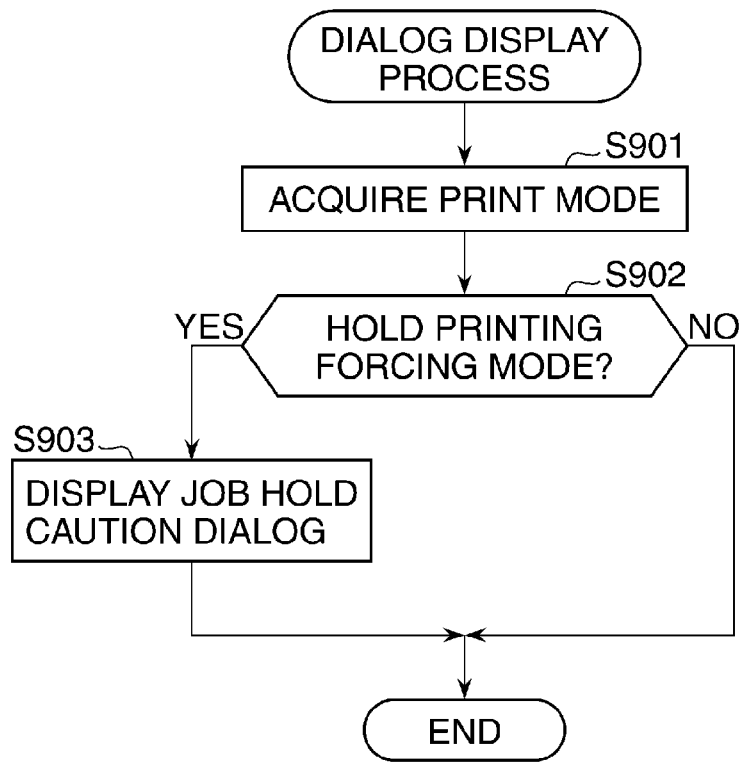
FIG. 9 is a flowchart of a dialog display process for displaying a dialog on a remote terminal during execution of the job holding process in the second embodiment.

FIG. 9 is a flowchart of a dialog display process for displaying a dialog on the remote terminal 111 during execution of the job holding process by the second embodiment.

As described in the printing process shown in FIG. 7, the image forming apparatus 100 shifts to the hold printing forcing mode, depending on whether or not the terminal identification information on the remote terminal 111 has been registered. Then, the CPU 102 notifies the remote terminal 111 of the fact. In other words, the remote terminal 111 acquires the print mode of the image forming apparatus 100 from the same (step S901).

In response to the notification from the CPU 102, the remote terminal 111 checks whether or not the image forming apparatus 100 is in the hold printing forcing mode (step S902). If the image forming apparatus 100 is not in the hold printing forcing mode (NO to the step S902), the remote terminal 111 terminates the dialog display process without displaying a job hold caution dialog on its display section, followed by terminating the dialog display process.

On the other hand, if the image forming apparatus 100 is in the hold printing forcing mode (YES to the step S902), the remote terminal 111 displays the job hold caution dialog on its display section (step S903), followed by terminating the dialog display process.

Figure 10:
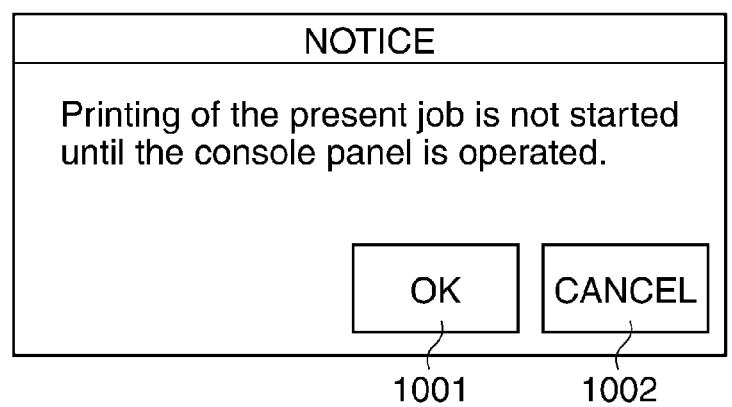
FIG. 10 is a view of an example of the dialog displayed on the remote terminal during the dialog display process in FIG. 9.

FIG. 10 is a view of an example of the job hold caution dialog displayed on the remote terminal during the dialog display process in FIG. 9.

Referring to FIG. 10, the job hold caution dialog displays a message "Printing of the present job is not started until the console panel is operated", together with an OK button 1001 and a cancel button 1002.

When the user presses the OK button 1001, a notification indicating that the message was understood is transmitted from the remote terminal 111 to the image forming apparatus 100. As a consequence, the CPU 102 resumes the process described with reference to FIG. 7. On the other hand, when the user presses the cancel button 1002, a notification indicative of cancellation of the print job is transmitted from the remote terminal 111 to the image forming apparatus 100. As a consequence, the CPU 102 cancels the print job.

As described above, according to the second embodiment, when it is determined that a wireless access point is vulnerable in terms of security, the image forming apparatus 100 holds a print job received from a remote terminal, depending on whether or not the terminal identification information on the remote terminal has been registered. Then, whether or not to execute printing is determined according to an operation of the console panel by the user. This makes it possible not only to prevent unauthorized access from the remote terminal, but also to improve user friendliness.

As is apparent from the above description, in the example in FIG. 1, the CPU 102 functions as a first determination unit, a second determination unit, a control unit, and a suspending unit. Further, the CPU 102 and the printer section 106 function as a printing unit. Furthermore, the CPU 102 and the console panel 109 function as a setting unit, and the CPU 102 functions as a mode shifting unit. In addition, the CPU 102 functions as a registration determination unit.

Although in the above-described embodiments, the image forming apparatus was described as an example of the printing apparatus, the present invention can be similarly applied to an apparatus other than the printing apparatus. For example, the present invention is also applicable to a case where a computer is used via an external apparatus through wireless communication.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

For example, the functions of either of the above-described embodiments can be accomplished by causing the printing apparatus to execute the functions as a control method. Further, the functions of either of the above-described embodiments may be accomplished by causing a computer incorporated in the printing apparatus to execute a program implementing the functions, as a control program. Note that the control program is stored e.g. in a computer-readable storage medium.

In this case, each of the control method and the control program includes at least a reception step, a first determination step, a printing step, a second determination step, and a control step.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

This application claims priority from Japanese Patent Application No. 2011-256101 filed Nov. 24, 2011, which is hereby incorporated by reference herein in its entirety.

What is claimed is:

1. A printing apparatus capable of communicating with external apparatuses, comprising:
    a reception unit configured to receive print data from an external apparatus through wireless communication;
    a first determination unit configured to determine whether or not the received print data has authentication information added thereto;
    a printing unit configured to print, when said first determination unit has determined that the print data has authentication information added thereto, the image data, depending on reception of the authentication information from a user, at the printing apparatus;
    a second determination unit configured to determine whether or not a level of security of an encryption method employed in the wireless communication is lower than a predetermined security level; and
    a control unit configured to restrict, when said first determination unit determines that the print data does not have authentication information added thereto and when said second determination unit determines that the level of security is lower than the predetermined security level, printing based on the received print data.

2. The printing apparatus according to claim 1, further comprising a setting unit configured to set a job to be executed in the printing apparatus to one of a secure job setting for causing the job to be executed in a secure job mode of the printing apparatus in which a predetermined input operation is required and a normal job setting for causing the job to be executed in a normal job mode of the printing apparatus in which the predetermined input operation is not required; and
    a mode shifting unit configured to forcibly shift, when said second determination unit determines that the level of security is lower than the predetermined security level, the printing apparatus to the secure job mode to thereby bring the printing apparatus into a secure job forcing mode.

3. The printing apparatus according to claim 1, wherein the external apparatus includes a designation unit configured to designate authentication information for the print data before transmission of the print data.

4. The printing apparatus according to claim 2, wherein the external apparatus includes:
    an acquisition unit configured to acquire a job mode of the printing apparatus,
    a mode determination unit configured to determine whether or not the job mode acquired by said acquisition unit is the secure job forcing mode, and
    a display control unit configured to display, when said mode determination unit determines that the job mode is the secure job forcing mode, an operation screen in which a secure job is designated.

5. The printing apparatus according to claim 1, wherein before transmission of the job, the external apparatus transmits identification information for identifying at least the external apparatus, and
    wherein said control unit includes:
    a registration determination unit configured to determine, when said second determination unit determines that the level of security is lower than the predetermined security level, whether or not the identification information on the external apparatus as a transmission source has been registered in advance, and
    a suspending unit configured to suspend, when said registration determination unit determines that the identification information has not been registered yet, the printing being executed based on the print data.

6. The printing apparatus according to claim 5, wherein when said control unit causes said suspending unit to suspend the printing being executed based on the print data, said control unit notifies the external apparatus that the printing based on the print data has been suspended.

7. The printing apparatus according to claim 5, wherein when said control unit causes said suspending unit to suspend the printing being executed based on the print data, said control unit displays information for identifying the print data on a display section, and causes the printing based on the print data to be resumed when an input operation intended for processing of the print data is performed before lapse of a predetermined time period.

8. The printing apparatus according to claim 7, wherein when said control unit causes the printing based on the print data to be resumed, said control unit registers the identification information on the external apparatus having transmitted the print data printing of which is resumed, in an authorization list for job authorization.

9. The printing apparatus according to claim 7, wherein when the input operation is not performed before lapse of the predetermined time period, said control unit determines that timeout has occurred, and increments the number of times of timeout, whereafter when the number of times of timeout exceeds a predetermined number, said control unit registers the identification information on the external apparatus having transmitted the print data in a refusal list for refusal of printing.

10. The printing apparatus according to claim 1, wherein, when said first determination unit has determined that the print data has authentication information added thereto and the authentication information has been received from the user, the printing unit is configured to print the image data regardless of the level of security of the encryption method employed in the wireless communication.

11. The printing apparatus according to claim 1, wherein the printing unit is configured to print, when said first determination unit has determined that the print data has authentication information added thereto, the image data, depending on reception of the authentication information from the user, at the printing apparatus, the reception of the authentication information from the user being after said first determination unit has determined that the print data has authentication information added thereto.

12. A method of controlling a printing apparatus, comprising:
    receiving print data from an external apparatus through wireless communication;
    determining whether or not the received print data has authentication information added thereto;
    printing, when it is determined that the print data has authentication information added thereto, the image data, depending on reception of the authentication information from a user;
    determining whether or not a level of security of an encryption method employed in the wireless communication is lower than a predetermined security level; and
    restricting, when it is determined that the print data does not have authentication information added thereto and when it is determined that the level of security is lower than the predetermined security level, printing based on the received print data.

13. A non-transitory computer-readable storage medium storing a computer-executable control program for causing a computer to execute a method of controlling a printing apparatus,
    wherein the method comprises:
    receiving print data from an external apparatus through wireless communication;
    determining whether or not the received print data has authentication information added thereto;
    printing, when it is determined that the print data has authentication information added thereto, the image data, depending on reception of the authentication information from a user;
    determining whether or not a level of security of an encryption method employed in the wireless communication is lower than a predetermined security level; and
    restricting, when it is determined that the print data does not have authentication information added thereto and when it is determined that the level of security is lower than the predetermined security level, printing based on the received print data.

* * * * *